(12) United States Patent
Chang et al.

(10) Patent No.: US 8,056,879 B2
(45) Date of Patent: Nov. 15, 2011

(54) HIGH PRECISION MIRROR MOUNT

(76) Inventors: Sie-Poon Chang, New York, NY (US); Peter Chang, New York, NY (US)

( * ) Notice: Subject to any disclaimer, the term of this patent is extended or adjusted under 35 U.S.C. 154(b) by 391 days.

(21) Appl. No.: 12/370,604

(22) Filed: Feb. 13, 2009

(65) Prior Publication Data

US 2010/0207005 A1 Aug. 19, 2010

(51) Int. Cl.
*A47G 1/24* (2006.01)

(52) U.S. Cl. .......................... 248/478; 248/468; 359/872

(58) Field of Classification Search .................. 248/466, 248/468, 474, 478, 481, 483, 574; 359/871, 359/872

See application file for complete search history.

(56) References Cited

U.S. PATENT DOCUMENTS

| | | | | |
|---|---|---|---|---|
| 4,925,288 A | * | 5/1990 | Harris | 359/876 |
| 5,703,683 A | * | 12/1997 | Hunt et al. | 356/301 |
| 5,798,879 A | * | 8/1998 | Salvio | 359/857 |
| 6,411,447 B1 | * | 6/2002 | Hilbert | 359/822 |

* cited by examiner

*Primary Examiner* — Gwendolyn W Baxter

(57) ABSTRACT

A high precision mirrormount comprises a retaining plate retaining reflecting mirror; an adjusting plate behind the retaining plate; a retaining ball fixed between the retaining plate and the adjusting plate; a fine-adjusting plate installed at the backside of the adjusting plate; a tension shaft fixed to the adjusting plate and exposing out of the fine-adjusting plate; tension springs being installed around the tension shaft; a first adjusting screw serving to coarsely adjust the adjusting plate to move closer or far away from the retaining plate; and a second adjusting screw having one end resisting against an elastic element which has an elastic coefficient of the elastic element being very smaller than those of the tension springs. Thus, the second adjusting screw has an effect of fine adjustment. In 2D case, two above structures are formed along an X axis and a Y axis respectively.

8 Claims, 9 Drawing Sheets

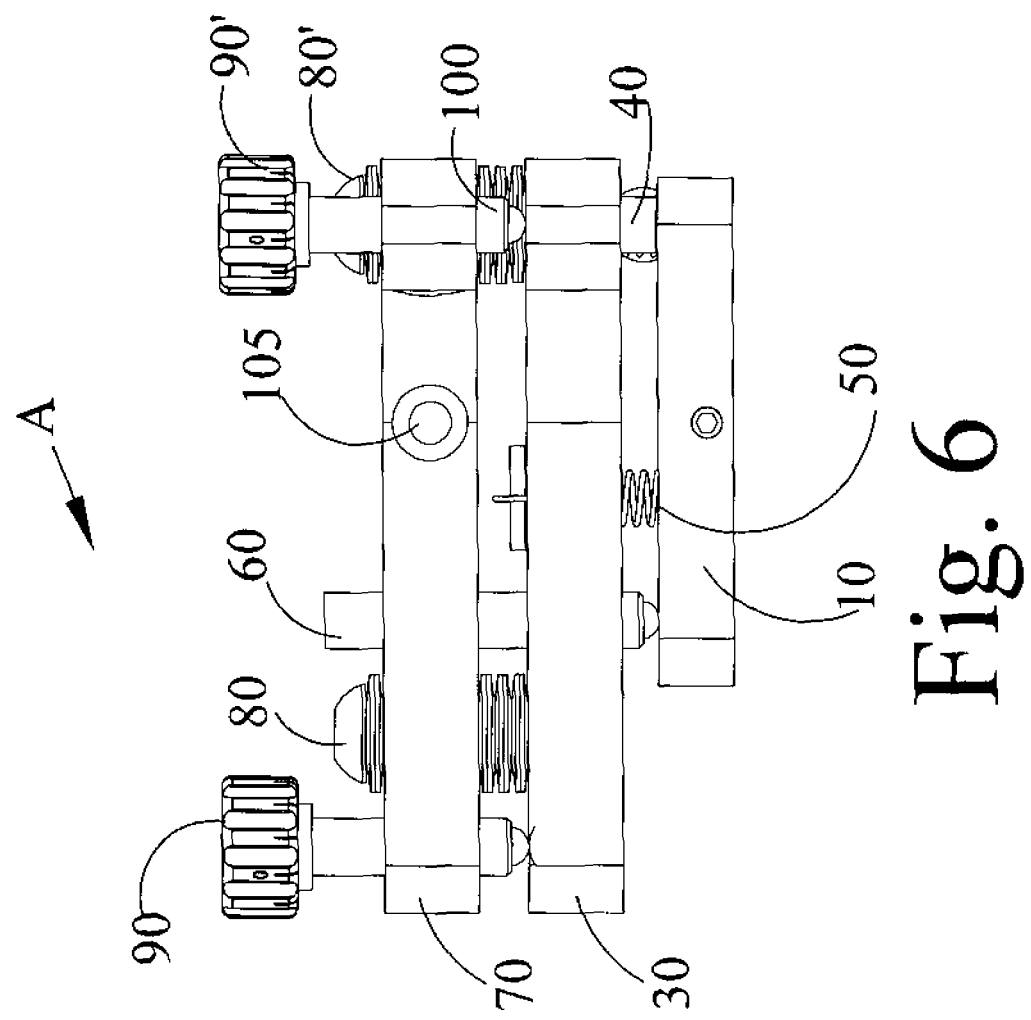

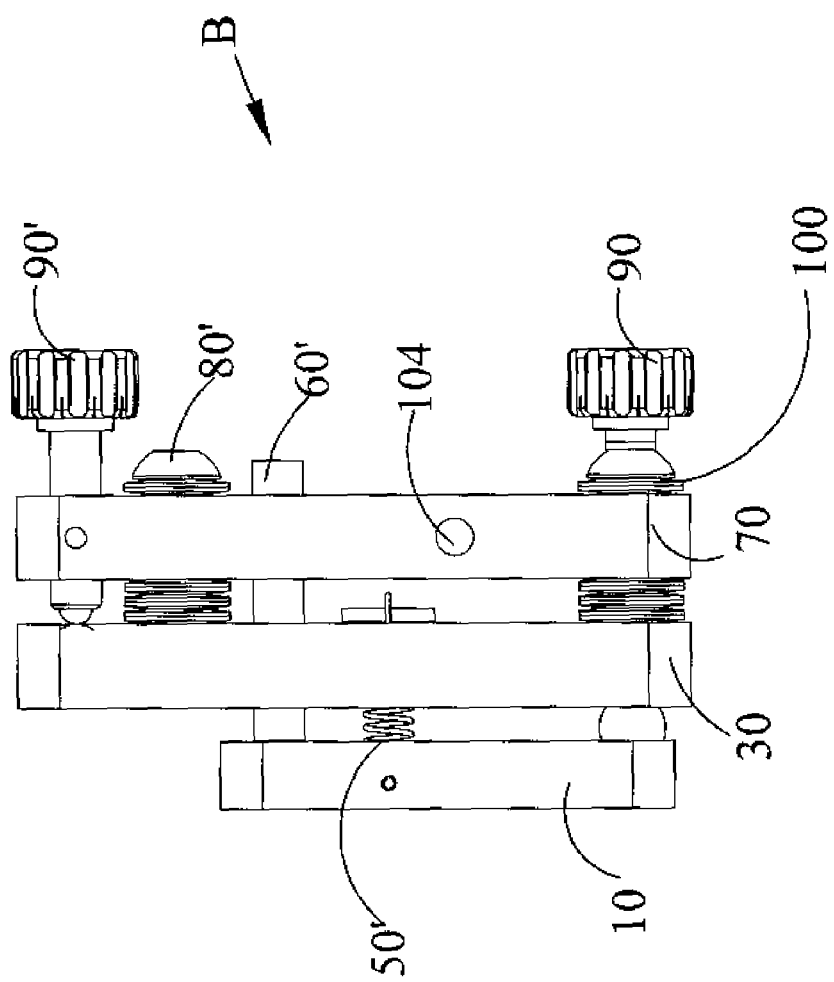

HIGH PRECISION MIRROR MOUNT

FIELD OF THE INVENTION

The present invention relates to a high precision mirrormount, wherein other than the retaining plate, an adjusting plate and a fine-adjusting plate are added to the prior art mirrormount. Thus, the present invention provides a fine adjustment to the prior art mirrormount to assist the original coarse adjustment so that the user can control the pointing of the reflecting light beam precisely and thus quickly.

BACKGROUND OF THE INVENTION

In optical applications, it is often that a light beam must be pointed to a desired projection point through a reflect operation, such as in the applications of Interferometry, Metrology etc. Thus a reflecting mirror is used to reflect an incident light beam and then reflects the incident light beam to a desired projection point. However if the reflecting light beam can not exactly point to the desired projection point, the user must adjust the orientation of the reflecting mirror so as to guide the light beam to the projection point. Because it is required that the light beam to point the projection point with a very high precision, adjustment of the orientation of the reflecting mirror must be very precise.

A prior way for adjusting the orientation of the reflecting mirror is illustrated in the FIGS. 1A and 1B. In the following, the elements of this prior art structure will be described.

A reflecting mirror 20 serves to reflect incident light beam C and generate a reflecting light beam R to a desired projection point P. Generally, the reflecting light beam R can not firstly point to the desired projection point P so that the user must adjust the orientation of the reflecting mirror 20 to cause the reflecting light beam R to the desired projection point P.

A retaining plate 10 serves for fixing the reflecting mirror 20.

An adjusting plate 30 is located at the backside side of the retaining plate 10.

In this case, the retaining plate 10 is formed with a recess 11 and the adjusting plate 30 is formed with another recess 33. The retaining ball 40 is fixed between the recess 11 of the retaining plate 10 and the recess 33 of the adjusting plate 30.

A retaining spring 50 is fixed between the retaining plate 10 and the adjusting plate 30. The retaining spring 50 has the effect of pulling the retaining plate 10 and the adjusting plate 30 to be closer, while the retaining ball 40 cause that the retaining plate 10 and the adjusting plate 30 to be retained in a predetermined distance; and thus the structure formed by the retaining plate 10, the adjusting plate 30, the retaining ball 40 and the retaining spring 50 is retained in a fixed relation.

As above mentioned, it is desired to adjust the orientation of the reflecting mirror 20 slightly so that the reflecting light beam R moves to a desired point P. A first adjusting screw 60 has one end resisted against the reflecting plate 10 and a section of the first adjusting screw 60 is threadedly engaged to the threaded hole 32 of the adjusting plate 30, while another end of the first adjusting screw 60 exposed out of a backside of the adjusting plate 30. In adjusting, as the user adjusts the first adjusting screw 60, it will cause the retaining plate 10 and the adjusting plate 30 to move close or away from each other.

However in above mentioned prior art, due to the sensitivity of the hand of the user, each moving step of the adjusting screw 60 is confined. As a result, it is often that the step moving distance is above several micrometers. However this step distance is too large so that the user can not well control the reflecting direction of the reflecting light beam R which induces the difficult in adjustment.

SUMMARY OF THE INVENTION

Accordingly, the primary object of the present invention is to provide a high precision mirrormount, wherein other than the retaining plate, an adjusting plate and a fine-adjusting plate are added to the prior art mirrormount. Thus, the present invention provides a fine adjustment to the prior art mirrormount to assist the original rough adjustment so that the user can control the pointing of the reflecting light beam precisely and thus quickly.

To achieve above objects, the present invention provides a high precision mirrormount comprising: a reflecting mirror for reflecting incident light beam and generating a reflecting light beam to a desired projection point; a retaining plate for fixing the reflecting mirror; an adjusting plate located at a backside of the retaining plate; a retaining ball fixed between the retaining plate and the adjusting plate; a retaining spring fixed between the retaining plate and the adjusting plate; the retaining spring having an effect of pulling the retaining plate and the adjusting plate to be closer, while the retaining ball causes that the retaining plate and the adjusting plate to be retained in a predetermined distance; a fine-adjusting plate installed at the backside of the adjusting plate; a tension shaft having a first end passing through the fine-adjusting plate and then fixed to the adjusting plate; a second end of the tension shaft exposing out of the fine-adjusting plate from a through hole of the fine-adjusting plate; a first tension spring being installed between the adjusting plate and the fine-adjusting plate and enclosing around a section of the tension shaft between the adjusting plate and the fine-adjusting plate; a second tension spring being installed between the fine-adjusting plate and the tension shaft and enclosing around another section of the tension shaft; the first tension spring having a first elastic coefficient and the second tension spring having a second elastic coefficient; the first elastic coefficient and the second elastic coefficient are large, which can make the tension shaft to be firmly retained between the adjusting plate and the fine-adjusting plate; a first adjusting screw having one end resisted against the reflecting plate and a section of the first adjusting screw being threadedly engaged to the adjusting plate, while another end of the first adjusting screw exposing out of a backside of the adjusting plate; and a second adjusting screw having a section threadedly engaged to the fine-adjusting plate and then exposing out of the fine-adjusting plate; an elastic element being attached to a distal end of the second adjusting screw and being confined between the adjusting plate and the distal end of the second adjusting screw; a third elastic coefficient of the elastic element being much smaller than the elastic coefficient of the first tension spring and the elastic coefficient of the second tension spring; to rotate the second adjusting screw forwards will cause the fine-adjusting plate to move away from the adjusting plate.

The present invention is also suitable to be used in a two dimensional structure. In 2D case, each of the adjusting plate 30 and fine-adjusting plate 70 has an L shape and are aligned so that the structure of the present invention is formed along an X axis and a Y axis of the L shape.

The various objects and advantages of the present invention will be more readily understood from the following detailed description when read in conjunction with the appended drawing.

BRIEF DESCRIPTION OF THE DRAWINGS

FIG. 6 is a lateral view of the high precision mirrormount of the present invention for the two dimensional case illustrated in FIG. 3.

FIG. 7 is another lateral view of the high precision mirrormount of the present invention for the two dimensional case illustrated in FIG. 3, which is viewed from another side different from that shown in FIG. 6.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1A:
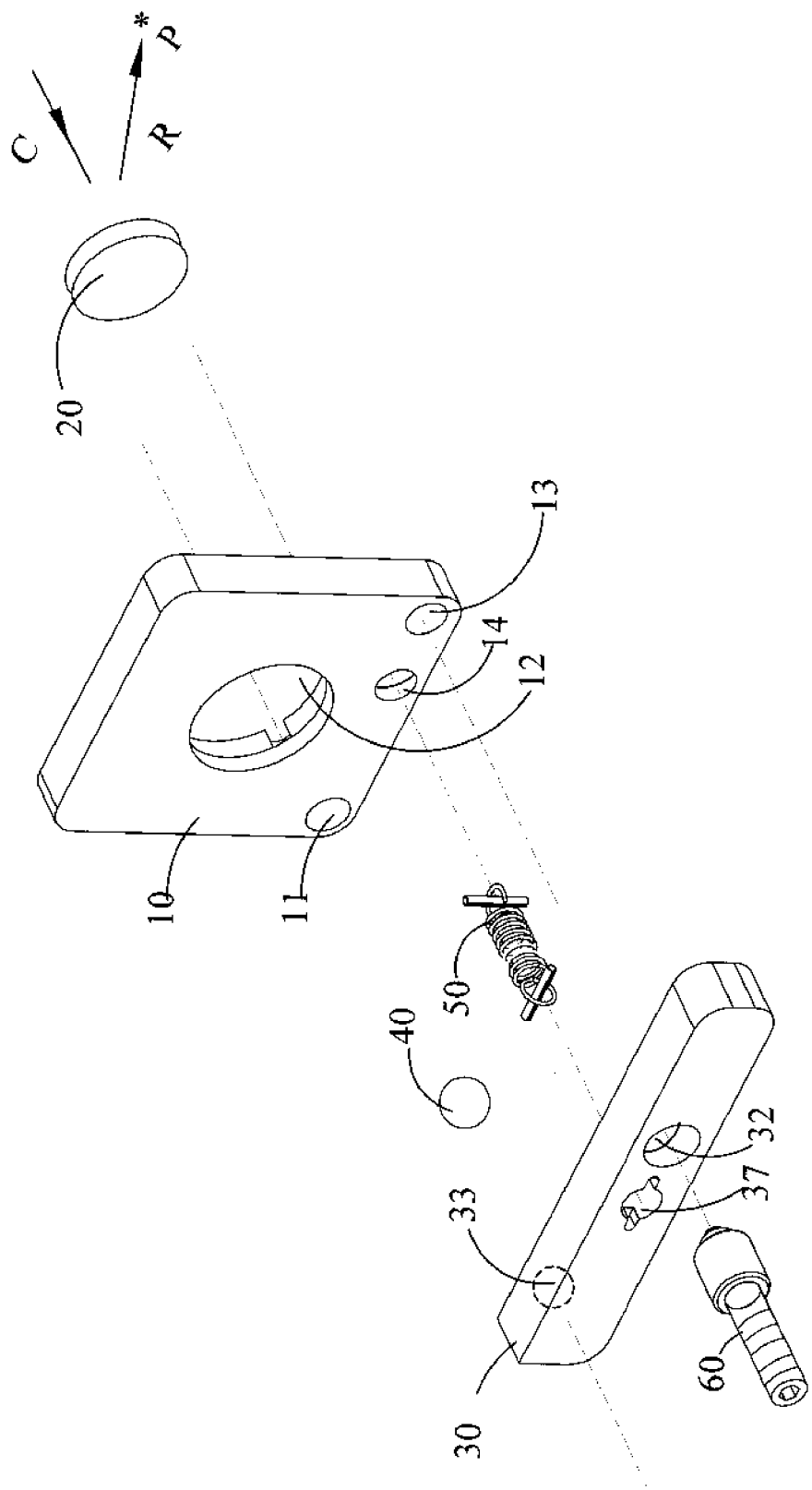
FIG. 1A is a schematic perspective view showing the prior art mirrormount.
Figure 1B:
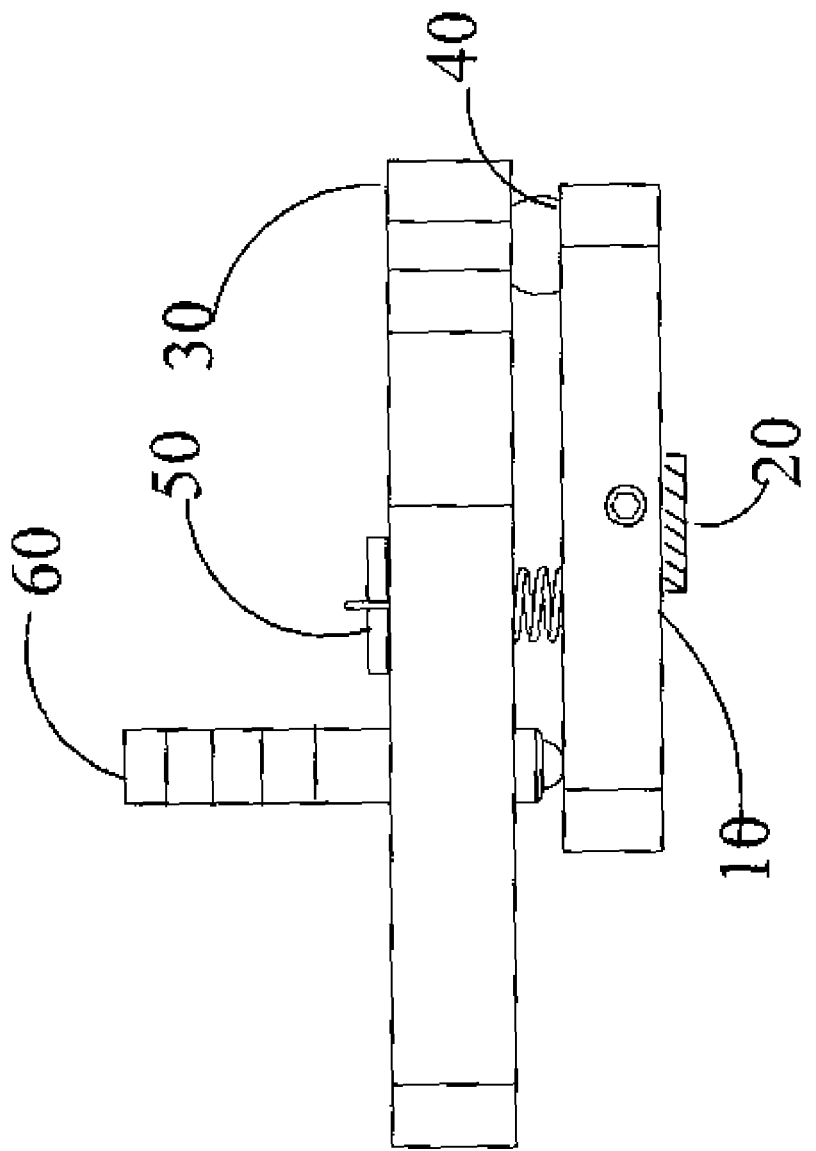
FIG. 1B is a lateral assembled view of the prior art mirrormount.
Figure 2A:
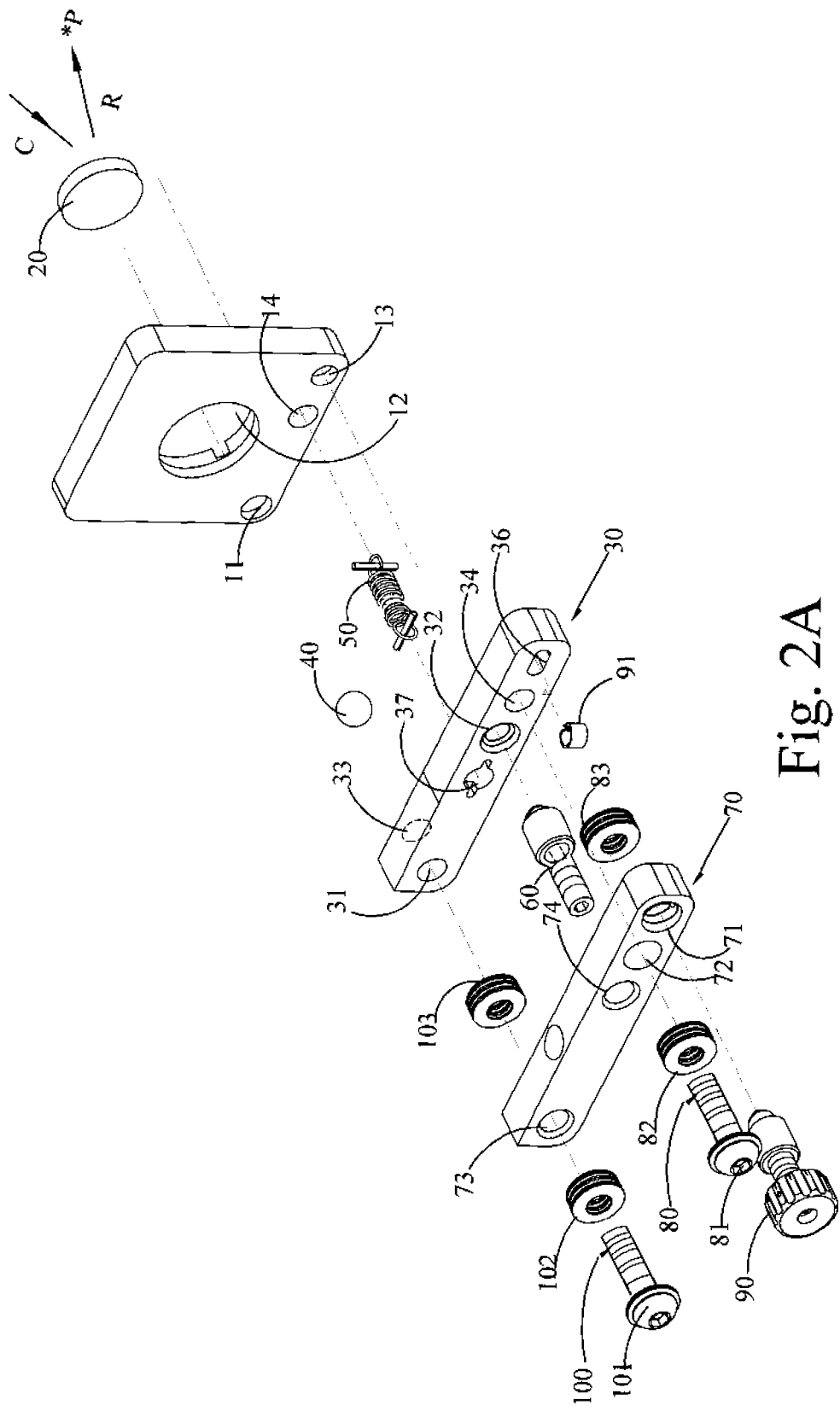
FIG. 2A is a perspective view of the high precision mirrormount of the present invention, where a one dimensional structure is illustrated.
Figure 2B:
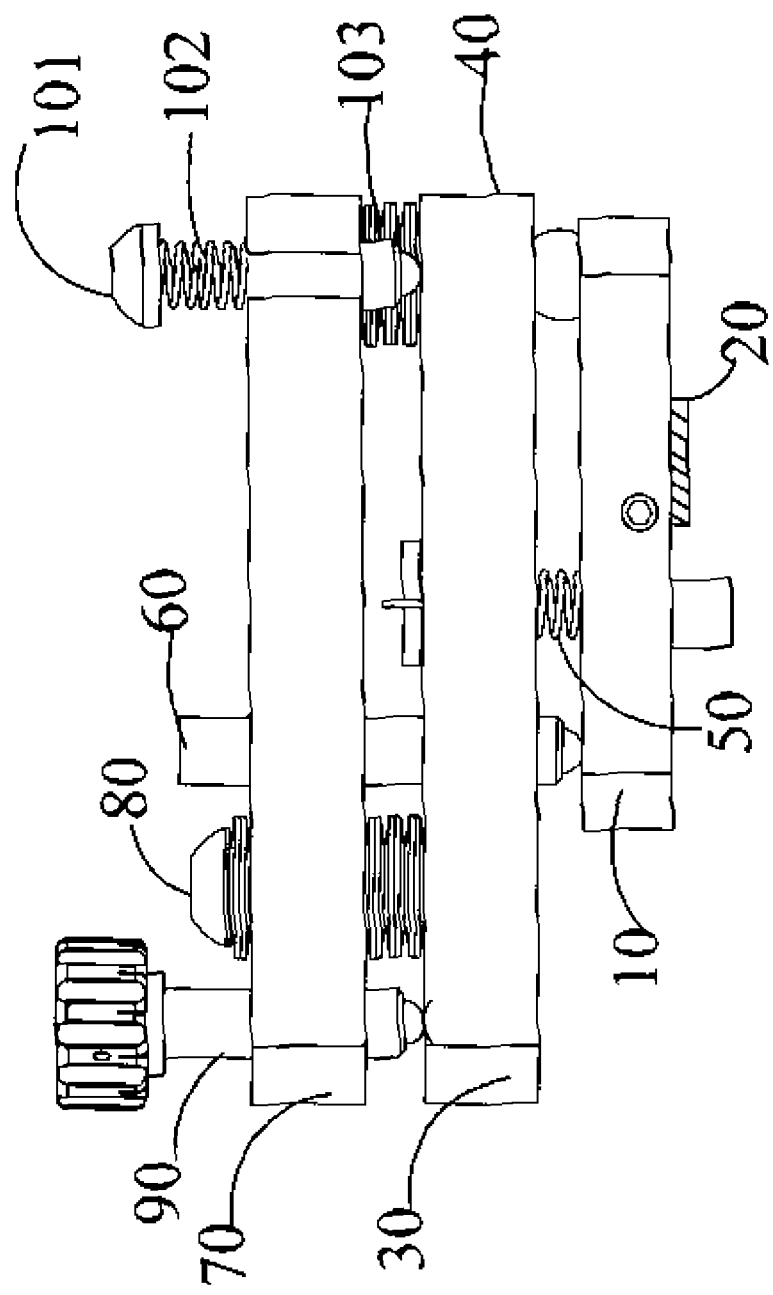
FIG. 2B is a lateral assembled view of the high precision mirrormount of the present invention, where a one dimensional structure is illustrated.

The high precision mirrormount of the present invention will be described herein with reference to FIGS. 2A, 2B and 3 to 7, where FIG. 2A is a perspective view of the high precision mirrormount of the present invention, where a one dimensional structure is illustrated. And FIG. 2B is a lateral assembled view of the high precision mirrormount of the present invention, where a one dimensional structure is illustrated.

The elements of the high precision mirrormount of the present invention are illustrated in the following.

A reflecting mirror 20 serves to reflect incident light beam C and generate a reflecting light beam R to a desired projection point P. Generally, the reflecting light beam R can not firstly point to the desired point P so that the user must adjust the orientation of the reflecting mirror 20 to cause the reflecting light beam R to the desired projecting point P.

A retaining plate 10 serves for fixing the reflecting mirror 20. For example, the reflecting mirror 20 can be tightly embedded into or screwed to the retaining plate 10. In the drawing, the reflecting mirror 20 is embedded into an opening 12 in the retaining plate 10.

An adjusting plate 30 is located at the backside of the retaining plate 10.

A retaining ball 40 is fixed between the retaining plate 10 and the adjusting plate 30. In this case, the retaining plate 10 is formed with a recess 11 and the adjusting plate 30 is formed with a recess 33. The retaining ball 40 is fixed between the recess 11 of the retaining plate 10 and the recess 33 of the adjusting plate 30.

A retaining spring 50 is fixed between a through hole 14 of the retaining plate 10 and a through hole 37 of the adjusting plate 30. The retaining spring 50 has the effect of pulling the retaining plate 10 and the adjusting plate 30 to be closer, while the retaining ball 40 cause that the retaining plate to and the adjusting plate 30 to be retained in a predetermined distance; and thus the structure formed by the retaining plate 10, the adjusting plate 30, the retaining ball 40 and the retaining spring 50 is retained in a fixed relation.

A fine-adjusting plate 70 is installed at the backside of the adjusting plate 30.

A tension shaft 80 has a first end passing through a through hole 72 of the fine-adjusting plate 70 and then fixed into a threaded hole 34 of the adjusting plate 30. A second end of the tension shaft 80 exposes out of the fine-adjusting plate 70 from the through hole 72 of the fine-adjusting plate 70. The second end has an enlarged head 81. A first tension spring 82 is installed between the fine-adjusting plate 70 and the enlarged head 81 of the tension shaft 80 and encloses around the tension shaft 80. A second tension spring 83 is installed between the adjusting plate 30 and the fine-adjusting plate 70 and encloses around a section of the tension shaft 80 between the adjusting plate 30 and the fine-adjusting plate 70. In the present invention, the first tension spring 82 has a first elastic coefficient of K1 and the second tension spring 83 has a second elastic coefficient of K2. The first elastic coefficient K1 and the second elastic coefficient K2 are large, which can make the tension shaft 80 to be firmly retained between the adjusting plate 30 and the fine-adjusting plate 70.

As above mentioned, it is desired to adjust the orientation of the reflecting mirror 20 slightly so that the reflecting light beam R points to a desired projecting point P. The following elements are installed for achieving above object.

A first adjusting screw 60 has one end resisting against an inner wall of a recess 13 in the retaining plate 10 and a middle section of the first adjusting screw 60 is threadedly engaged to a threaded hole 32 of the adjusting plate 30, while another end of the first adjusting screw 60 exposed out of a backside of the fine-adjusting plate 70 from a through hole 74 of the fine-adjusting plate 70, wherein the diameter of the through hole 74 is larger than that of the first adjusting screw 60 so as not to affect the movement of the first adjusting screw 60. Furthermore, a ball 61 can be installed between the end of the first adjusting screw 60 and the inner wall of the recess 13 for making the first adjusting screw 60 rotate freely and not be affected by the friction force from the inner wall of the recess 13. In assembly, it is preferable that the center of the ball 61, an axial line of the first adjusting screw 60, a center of the recess 13 are aligned so that in adjusting, the retaining plate 10 will move steadily forwards or backwards without wobbling.

In adjusting, as the user adjust the first adjusting screw 60, it will cause the retaining plate 10 and the adjusting plate 30 to move close or away from each other. In the present invention, to make the operation easy, the first adjusting screw 60 freely passes through the fine-adjusting plate 70 so that the user can hold the first adjusting screw 60 from the end out of the fine-adjusting plate 70 to have an easy pose for operation.

A second adjusting screw 90 has a section threadedly engaged to the fine-adjusting plate 70 and then exposes out from the fine-adjusting plate 70. A tip end of the second adjusting screw 90 is inserted into a recess 36 in the adjusting plate 30. An elastic element 91 is attached to the tip end of the second adjusting screw 90 and is confined between an inner wall of the recess 36 of the adjusting plate 30 and the tip end of the second adjusting screw 90. Herein, the elastic element 91 is a helical spring, an elastic reed or a spiral spring, etc., in the drawing, a C reed is illustrated. The third elastic coefficient K3 of the elastic element 91 is much smaller than the elastic coefficient K1 of the first tension spring 82 and the elastic coefficient K2 of the second tension spring 83. To rotate the second adjusting screw 90 forwards will cause the fine-adjusting plate 70 to move away from the adjusting plate 30. Similarly, a ball 92 can be attached to a front tip of the second adjusting screw 90, which achieves the same effect as those described for the ball 61.

A corner tension shaft 100 has a first end passing through a through hole 73 of the fine-adjusting plate 70 and then fixed into a threaded hole 31 of the adjusting plate 30. A second end of the corner tension shaft 100 exposes out of the fine-adjusting plate 70 from the through hole 73 of the fine-adjusting plate 70. The second end has an enlarged head 101. A fourth tension spring 102 is installed between the fine-adjusting plate 70 and the enlarged head 101 of the corner tension shaft 100 and encloses around the corner tension shaft 100. A fifth tension spring 103 is installed between the adjusting plate 30 and the fine-adjusting plate 70 and encloses around a section of the corner tension shaft 100 between the adjusting plate 30 and the fine-adjusting plate 70. In the present invention, the fourth tension spring 102 has a fourth elastic coefficient of K4 and the fifth tension spring 103 has a fifth elastic coefficient of K5. The fourth elastic coefficient K4 and the second elastic coefficient K5 are much larger than the third elastic coefficient K3 of the elastic element 91, which can make the tension shaft 100 to be firmly retained between the adjusting plate 30 and the fine-adjusting plate 70.

Operation of the present invention will be described herein with reference to FIGS. 4 and 5. In adjusting the orientation of the reflecting mirror 20, the user can firstly adjust the first adjusting screw 60 to make the adjusting plate 30 to move closer or far away from the retaining plate 10. However as above-mentioned, due to the precision of the human's hand, it is very difficult to adjust the reflecting beam to a desired projection point P at one time or based on the will of the user. At this moment, the user often adjusts the first adjusting screw 60 willinglessly by trial and error. Thus many times are required. However the present invention provides the second fine-adjusting screw 90 which causes that the adjusting plate 30 can move towards the retaining plate to slightly due to the design of the first tension spring 82, second tension spring 83 and the elastic element 91. The operation of this mechanism will be described herein. After the coarse adjustment of the first adjusting screw 60, the user then further adjusts the second adjusting screw 90 to cause the fine-adjusting plate 70 to move toward or away from the adjusting plate 30 with a higher resolution of ten times precision. However in movement of the fine-adjusting plate 70, since the elastic element 91 resisting against the second adjusting screw 90 has a third elastic coefficient K3 which is much smaller than the first elastic coefficient K1 of the first tension spring 82 and the second elastic coefficient K2 of the second tension spring 83, the elastic element 91 has a greater deformation than that of the first tension spring 82 and the second tension spring 83. The elastic element 91 is greatly compressed (in a compression case), while the first and second tension springs 82, 83 are deformed slightly. Namely, in fact, although the second adjusting screw 90 moves through a greater distance, the springs on the tension shaft 80 only deform slightly, that is, the fine-adjusting plate 70 only moves through a slight distance approximately identical to the deformation of the springs on the tension shaft 80. Thus, in adjusting, the user's hand holding the second adjusting screw 90 can have a greater moving extent, while the fine-adjusting plate 70 only moves through a much smaller distance. Namely, the precision is promoted. This is because the skillful design of the springs in the present invention.

Figure 3:
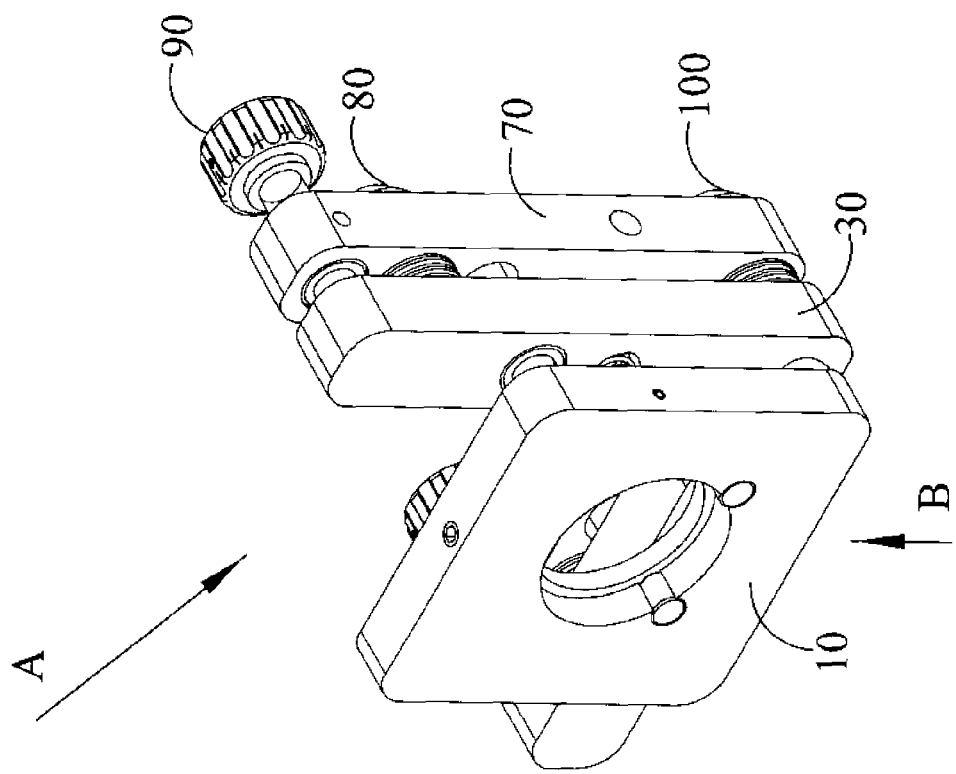
FIG. 3 is an assembled perspective view of the high precision mirrormount of the present invention, where a two dimensional structure is illustrated.
Figure 4:
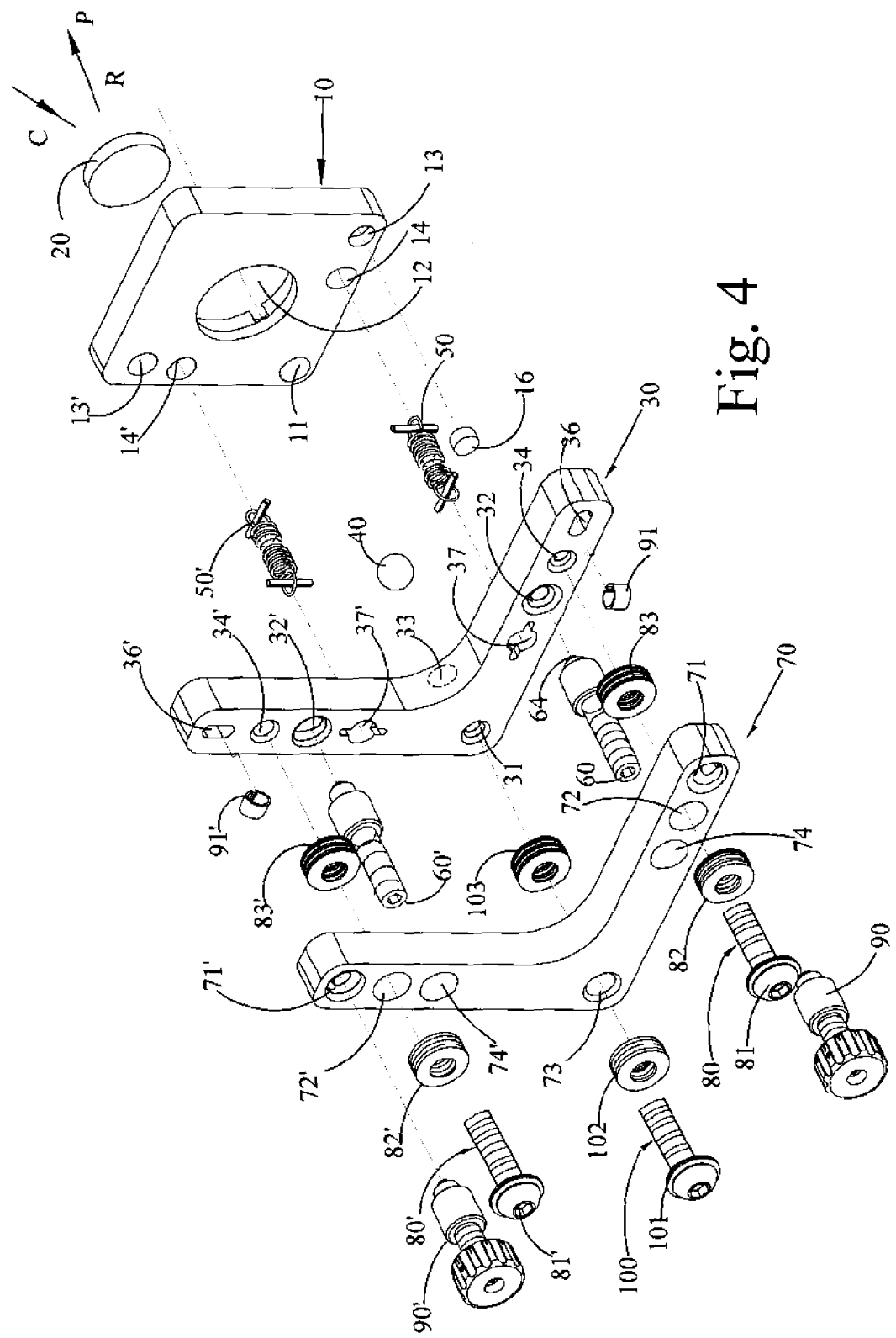
FIG. 4 is an exploded perspective views showing the elements of the high precision mirrormount of the present invention for a two dimensional case.
Figure 5:
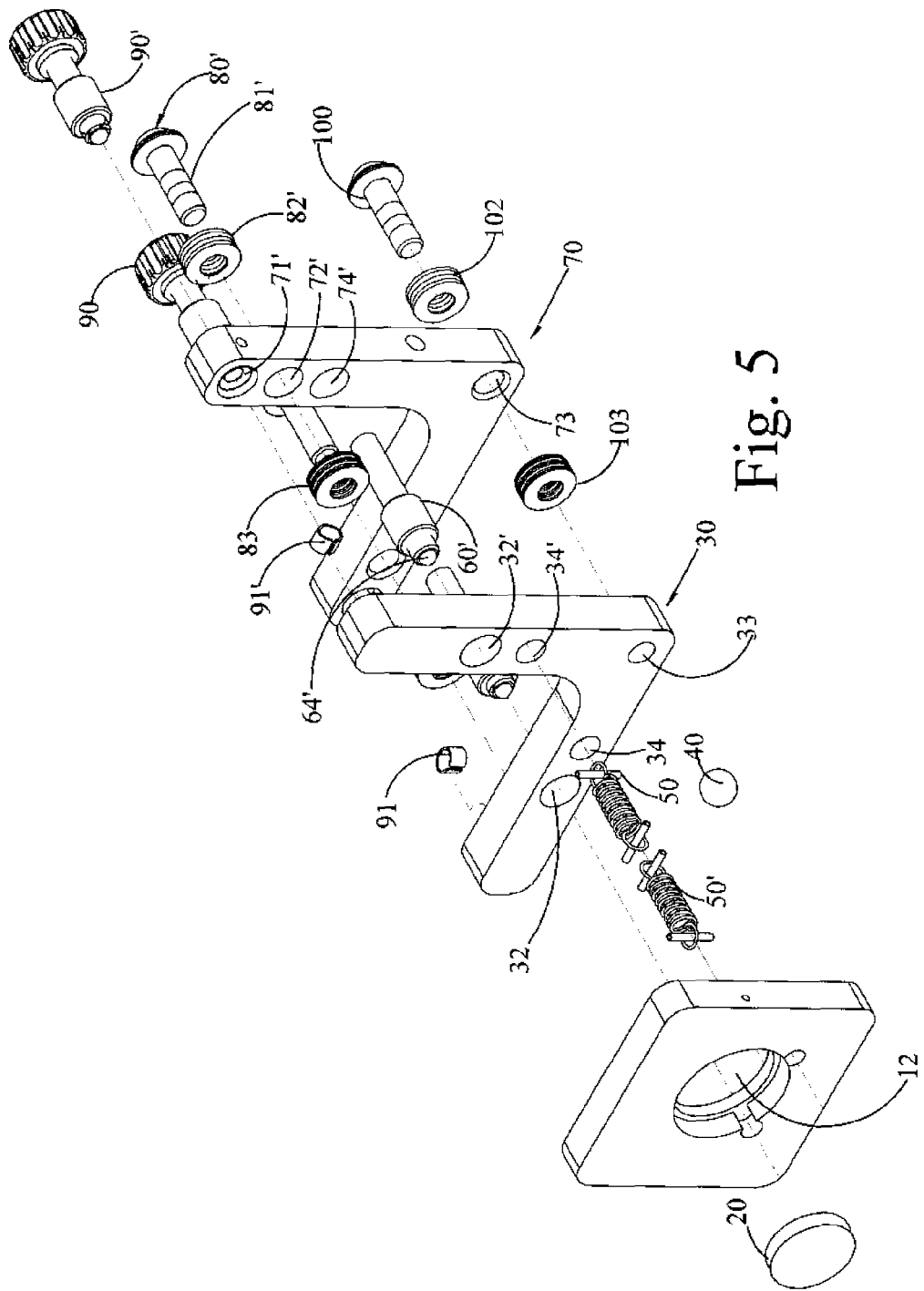
FIG. 5 is another exploded perspective views showing the elements of the high precision mirrormount of the present invention for a two dimensional case, which is viewed from another side of that illustrated in FIG. 4.

FIGS. 3 to 7 show the second embodiment of the present invention, in that a two-dimensional case according to the present invention is illustrated. FIG. 3 is an assembled perspective view of the high precision mirrormount of the present invention, where a two dimensional structure is illustrated. FIG. 4 is an exploded perspective view showing the elements of the high precision mirrormount of the present invention for a two dimensional case. FIG. 5 is another exploded perspective view showing the elements of the high precision mirrormount of the present invention for a two dimensional case, which is viewed from another side of that illustrated in FIG. 4. FIG. 6 is a lateral view of the high precision mirrormount of the present invention for the two dimensional case illustrated in FIG. 3. FIG. 7 is another lateral view of the high precision mirrormount of the present invention for the two dimensional case illustrated in FIG. 3, which is viewed from another side different from that shown in FIG. 6.

This embodiment is similar to above mentioned embodiment, and thus in the following, only those differences therebetween are described. The structure is similar to that disclosed above. In this embodiment, each of the adjusting plate 30 and fine-adjusting plate 70 has an L shape and are aligned so that the structure of the present invention is formed along an X axis and a Y axis of the L shape. In the X axis, the above-mentioned retaining spring 50, tension shaft 80, first adjusting screw 60, and second adjusting screw 90 are installed along X axis. In Y axis, there are a further set of retaining spring 50', tension shaft 80', a first tension spring 82', a second tension spring 83', first adjusting screw 60', and second adjusting screw 90' and an elastic element 91'. The corner tension shaft 100 is arranged at the corner area of the L shape of the adjusting plate 30 and fine-adjusting plate 70. Referring to FIGS. 6 and 7, each lateral side of the fine-adjusting plate 70 has a hole 120, 120' for retaining a rod-like assembly. By attaching the rod-like assembly, the mirrormount can be fixed to an optical table or some other solid structures.

The elements in X axis and Y axis are similar, but the physical coefficient, such as length, elastic coefficients etc. may be unequal. In this two dimensional structure, the reflecting mirror 20 can be adjusted along two axes so as to guide the reflecting light beam to move along two directions. Thus the user can adjust the structure of the present invention as desired.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A high precision mirrormount comprising:
   a reflecting mirror for reflecting incident light beam (C) and generate a reflecting light beam (R);
   a retaining plate (10) having an approximate (L) shape for fixing the reflecting mirror;
   an adjusting plate (30) located at the backside of the retaining plate (10) and having an approximate (L) shape;
   a retaining ball (40) fixed between the retaining plate (10) and the adjusting plate (30);
   a fine-adjusting plate (70) installed at the backside of the adjusting plate (30) and having an approximate L shape;
   wherein in assembly, the adjusting plate (30) and the fine-adjusting plate (70) are aligned so that the L shapes of the adjusting plate (30) and the fine-adjusting plate (70) are arranged along an X axis and a Y axis;

wherein each of the X axis of the Y axis is arranged with an adjusting assembly including:

a retaining spring (50) fixed between the retaining plate (10) and the adjusting plate (30); the retaining spring (50) having an effect of pulling the retaining plate (10) and the adjusting plate (30) to be closer, while the retaining ball (40) cause that the retaining plate (10) and the adjusting plate (30) to be retained in a predetermined distance;

a tension shaft (80) having a first end passing through the fine-adjusting plate (70) and then fixed to the adjusting plate (30); a second end of the tension shaft (80) exposing out of the fine-adjusting plate (70) from a through hole (72) of the fine-adjusting plate (70); a first tension spring (82) encloses the tension shaft (80) and being at a section of the tension shaft (80) out of the fine-adjusting plate (70); and a second tension spring (83) being installed between the adjusting plate (30) and the fine-adjusting plate (70) and enclosing around a section of the tension shaft (80) between the adjusting plate (30) and the fine-adjusting plate (70); the first tension spring (82) having a first elastic coefficient of K1 and the second tension spring (83) having a second elastic coefficient of K2; the first elastic coefficient (K1) and the second elastic coefficient (K2) are large, which can make the tension shaft (80) to be firmly retained between the adjusting plate (30) and the fine-adjusting plate (70);

a first adjusting screw (60) having one end resisting against an inner wall of a recess (13) in the reflecting plate (10) and a middle section of the first adjusting screw (60) being threadedly engaged to a threaded hole (32) of the adjusting plate (30), while another end of the first adjusting screw (60) exposed out of a backside of the adjusting plate (30) from a through hole (74) of the fine-adjusting plate (70), wherein the diameter of the through hole (74) is much larger than that of the first adjusting screw (60) so as not to affect the movement of the first adjusting screw (60); and a second adjusting screw (90) having a section threadedly engaged to the fine-adjusting plate (70) and then exposing out of the fine-adjusting plate (70); a tip end of the second adjusting screw (90) being inserted into a recess (36) in the adjusting plate (30); an elastic element (91) being attached to the tip end of the second adjusting screw (90) and being confined between an inner wall of the recess (36) of the adjusting plate (30) and the tip end of the second adjusting screw (90); a third elastic coefficient (K3) of the elastic element (91) being much smaller than the elastic coefficient (K1) of the first tension spring (82) and the elastic coefficient (K2) of the second tension spring (83); to rotate the second adjusting screw (90) forwards will cause the fine-adjusting plate (70) to move away from the adjusting plate (30).

2. The high precision mirrormount as claimed in claim (1), wherein the retaining plate (10) is formed with a recess (11) and the adjusting plate (30) is formed with a recess (33); the retaining ball (40) is fixed between the recess (11) of the retaining plate (10) and the recess (33) of the adjusting plate (30).

3. The high precision mirrormount as claimed in claim 1, wherein the first adjusting screw (60) passes through the fine-adjusting plate (70) so that the user can hold the first adjusting screw (60) from an end out of the fine-adjusting plate (70).

4. The high precision mirrormount as claimed in claim 1, wherein the elastic element (91) is one of a helical spring, an elastic reed, a spiral spring; an O reed; and a C reed.

5. The high precision mirrormount as claimed in claim 1, wherein the second end has an enlarged head (81); and the second tension spring (82) is installed between the fine-adjusting plate (70) and the enlarged head 81 of the tension shaft (80).

6. The high precision mirrormount as claimed in claim 1, wherein the reflecting mirror (20) is embedded into or screwed to, or riveted to the retaining plate (10).

7. The high precision mirrormount as claimed in claim 1, wherein a ball is installed between the end of the first adjusting screw (60) and the inner wall of the recess (13) for making the first adjusting screw (60) rotate freely and not being affected by the friction force from the inner wall of the recess (13).

8. The high precision mirrormount as claimed in claim 1, further comprising a corner tension shaft (100) installed at a corner area of the L shape of the adjusting plate and the fine-adjusting plate; the corner tension shaft (100) having a first end passing through a through hole (73) of the fine-adjusting plate (70) and then fixed into a threaded hole (31) of the adjusting plate (30); a second end of the corner tension shaft (100) exposing out of the fine-adjusting plate (70) from a through hole (73) of the fine-adjusting plate (70); the second end has an enlarged head (101); a fourth tension spring (102) being installed between the fine-adjusting plate (70) and the enlarged head (101) of the corner tension shaft (100) and enclosing around the tension shaft (100); a fifth tension spring (103) being installed between the adjusting plate (30) and the fine-adjusting plate (70) and enclosing around a section of the corner tension shaft (100) between the adjusting plate (30) and the fine-adjusting plate (70), the fourth tension spring (102) havings a fourth elastic coefficient of (K4) and the fifth tension spring (103) having a fifth elastic coefficient of (K5); the fourth elastic coefficient (K4) and the fifth elastic coefficient (K5) being much larger than the third elastic coefficient (K3) of the elastic element (91), which can make the corner tension shaft (100) to be firmly retained between the adjusting plate (30) and the fine-adjusting plate (70).

* * * * *